Figure 1:
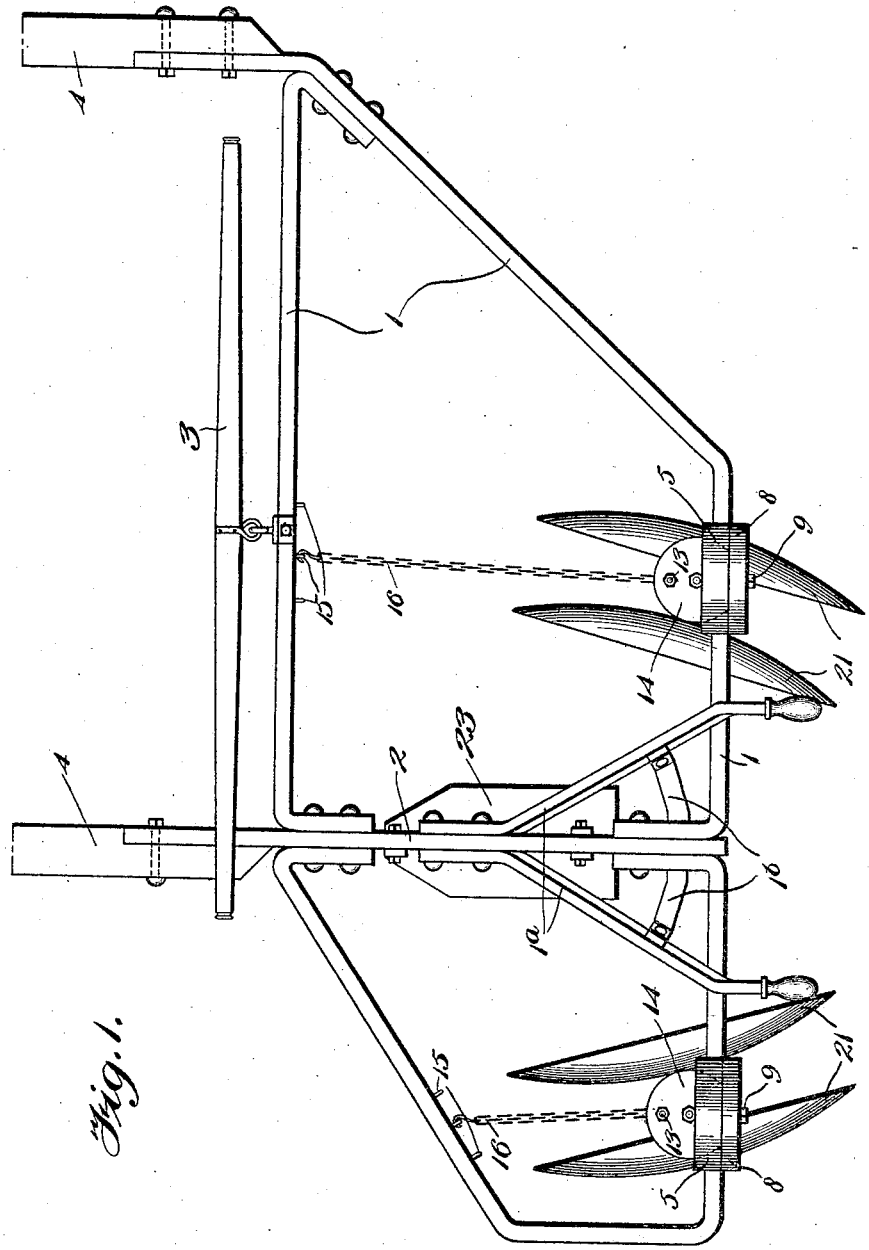

L. KANYO.
CULTIVATOR.
APPLICATION FILED MAR. 18, 1912.

1,074,502.

Patented Sept. 30, 1913.
2 SHEETS—SHEET 1.

Witnesses
Byron B. Collings.
H. W. Primul

Inventor
Louis Kanyo,
By
Wilkinson, Fisher & Witherspoon
Attorneys

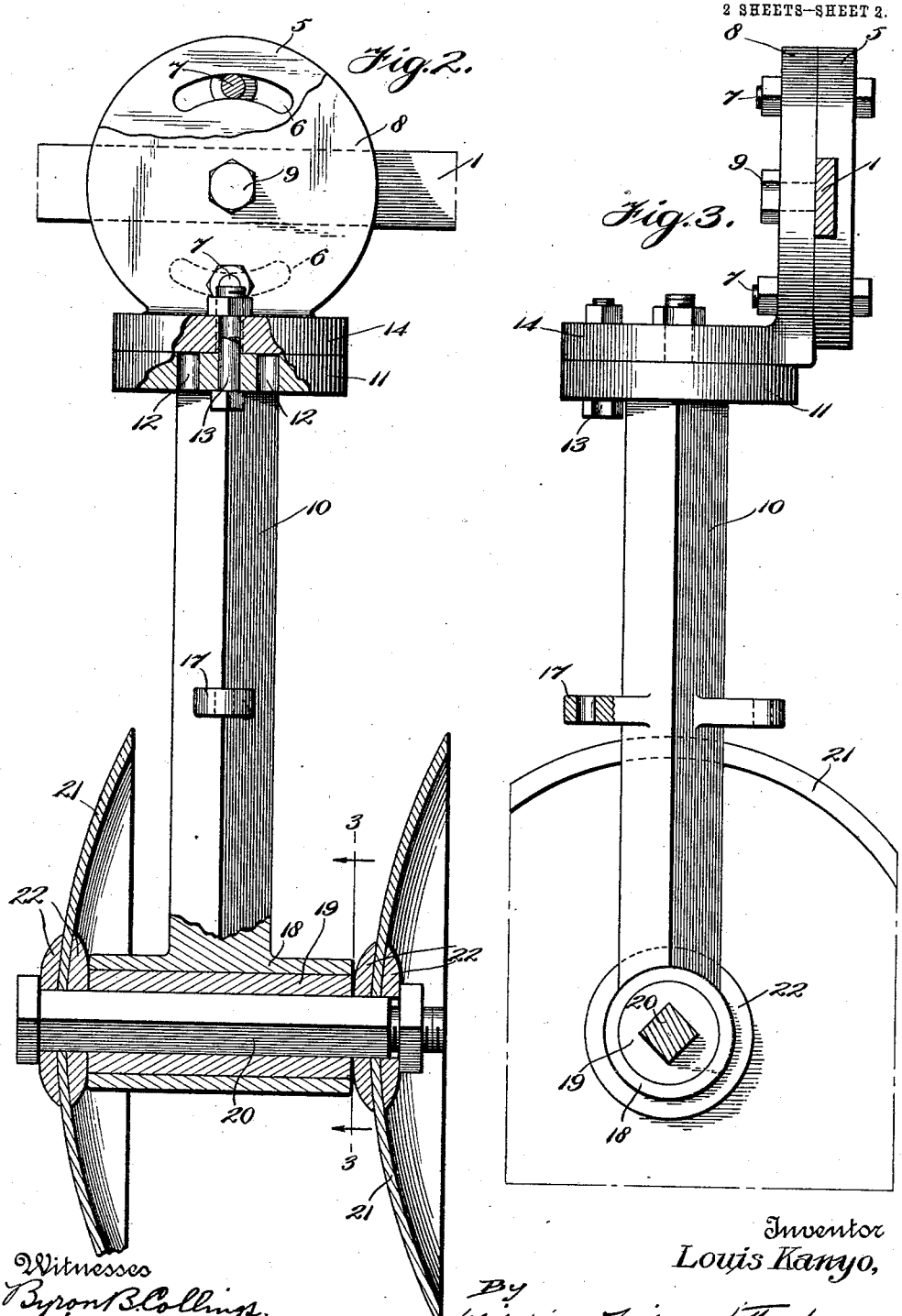

UNITED STATES PATENT OFFICE.

LOUIS KANYO, OF ALBANY, LOUISIANA.

CULTIVATOR.

1,074,502. Specification of Letters Patent. Patented Sept. 30, 1913.

Application filed March 18, 1912. Serial No. 684,431.

*To all whom it may concern:*

Be it known that I, LOUIS KANYO, a citizen of the United States, residing at Albany, in the parish of Livingston and State of Louisiana, have invented certain new and useful Improvements in Cultivators; and I do hereby declare the following to be a full, clear, and exact description of the invention, such as will enable others skilled in the art to which it appertains to make and use the same.

My invention relates to improvements in cultivators, and it consists in the constructions, combinations and arrangements herein described and claimed.

The object of my invention is to provide an improved cultivator, in which the disks can be readily shifted to throw the dirt at any desired angle, either toward or away from the plants, and adjusted for effective operation on hill-sides or for cultivating rows of listed plants.

In the accompanying drawings forming a part of this application, and in which similar reference symbols indicate corresponding parts in the several views:—Figure 1 is a plan view, illustrating one embodiment of my invention; Fig. 2 is an enlarged front elevation of one of the cultivator standards and its adjustable supports; and Fig. 3 is a section on the line 3—3 of Fig. 1.

Referring to the drawings, 1 indicates a horizontal cultivator frame provided with a cross member 2, and having a swingle-tree 3 and shafts 4 secured thereto; if desired, a pole and double-trees can be substituted for the shaft and swingle tree. Guiding handles 1ª are shown bolted to the frame member 2 and to supporting braces 1ᵇ on the frame.

Blocks 5 are provided with grooves for slidably receiving the rear frame member, and with concentric slots 6 for receiving clamping bolts 7 extending through the vertical heads 8 of angular brackets; said brackets being provided with set screws 9 for locking them in position on said frame. Standards 10 are provided with upper flanges 11 which are provided with series of holes 12 adapted to receive bolts 13 for adjustably securing said standards to the heads 14 of said brackets; by this construction, the brackets and standards can be angularly adjusted in planes perpendicular to each other. Eyes 15 are secured to the frame 1 for engaging the hooks of chains 16 attached to apertured lugs 17 on the standards 10 for firmly bracing the latter in all adjusted positions thereof.

The lower ends of the standards 10 are provided with extended bearings 18, in which are journaled sleeves 19 formed with square bores; square bolts 20 extending through such bores for rigidly clamping the cultivator disks 21 and interposed washers 22 to said sleeves.

From the above description, it will be clear that my invention provides an improved cultivator, in which the flanges 11 can be adjusted on the bracket heads 14 to throw dirt either toward or away from the plants at any desired angle, and the bracket heads 8 angularly adjusted on the blocks 5 to shift the cultivator disks into suitable position for effective operation on hill-sides or for cultivating rows of listed plants. The sliding blocks 5 can be secured at any desired space apart on the horizontal frame 1, and any well known form of deflector 23 can be bolted to the frame member 2 for protecting the plants during hilling of a crop.

I claim:—

In a cultivator the combination of a frame; a block having a groove receiving a member of the frame, and provided with concentric slots; an angular bracket having one part thereof pivotally mounted on said frame member and disposed against a surface of the block, and a horizontally disposed part providing a support; said first named bracket providing a support; said first named bracket part having slots registering with the slots of the block; bolts passing through said registering slots for securing the bracket in vertically adjusted positions; a standard provided with a flange swiveled on the horizontally disposed part of the bracket, said flange provided with a series of perforations; a bolt passing through said horizontal part and one of said flange perforations adapted to secure the standard in horizontally adjusted positions; and ground treating tools on said standard, substantially as described.

In testimony whereof, I affix my signature, in presence of two witnesses.

LOUIS KANYO.

Witnesses:
STEVE RESETAR,
ALEX NEMETH.

Copies of this patent may be obtained for five cents each, by addressing the "Commissioner of Patents, Washington, D. C."